United States Patent [19]

Burgdorf

[11] Patent Number: 4,892,363
[45] Date of Patent: Jan. 9, 1990

[54] ANTI-LOCKING BRAKE SYSTEM

[75] Inventor: Jochen Burgdorf, Offenbach-Rumpenheim, Fed. Rep. of Germany

[73] Assignee: Alfred Teves GmbH, Frankfurt Am Main, Fed. Rep. of Germany

[21] Appl. No.: 317,153

[22] Filed: Feb. 27, 1989

[30] Foreign Application Priority Data

Mar. 8, 1988 [DE] Fed. Rep. of Germany ....... 3807552

[51] Int. Cl.$^4$ .............................................. B60T 8/32
[52] U.S. Cl. ..................................... 303/116; 303/68; 303/119
[58] Field of Search ............... 303/116, 119, 114, 113, 303/10–12, 68–69, 61, 110, 92, 87; 188/181 A, 181 R; 60/545, 591; 303/DIGS. 1–4

[56] References Cited

U.S. PATENT DOCUMENTS

| 4,597,611 | 7/1986 | Nishimura et al. | 303/116 |
| 4,652,061 | 3/1987 | Nishimura et al. | 303/116 |
| 4,730,879 | 3/1988 | Adachi et al. | 303/116 |

FOREIGN PATENT DOCUMENTS

| 3601914 | 7/1987 | Fed. Rep. of Germany . |
| 3740516 | 6/1989 | Fed. Rep. of Germany . |
| 2056606 | 3/1981 | United Kingdom . |
| 2063402 | 6/1981 | United Kingdom . |

Primary Examiner—Douglas C. Butler
Attorney, Agent, or Firm—Robert P. Seitter

[57] ABSTRACT

For the purpose of optimizing the suction behavior of a pump in an anti-locking brake system in which the pressure acting on the wheel brakes is reducible by bleeding hydraulic fluid through a return line, with a hydraulic pump whose suction chamber is connected through a suction line to a hydraulic fluid reservoir, the return line is connected to the suction chamber, a hydraulic link existing simultaneously between the return line and the suction line and a release valve and/or a reserve volume cylinder is inserted in the return line upstream of the point of connection between return line and suction line.

7 Claims, 1 Drawing Sheet

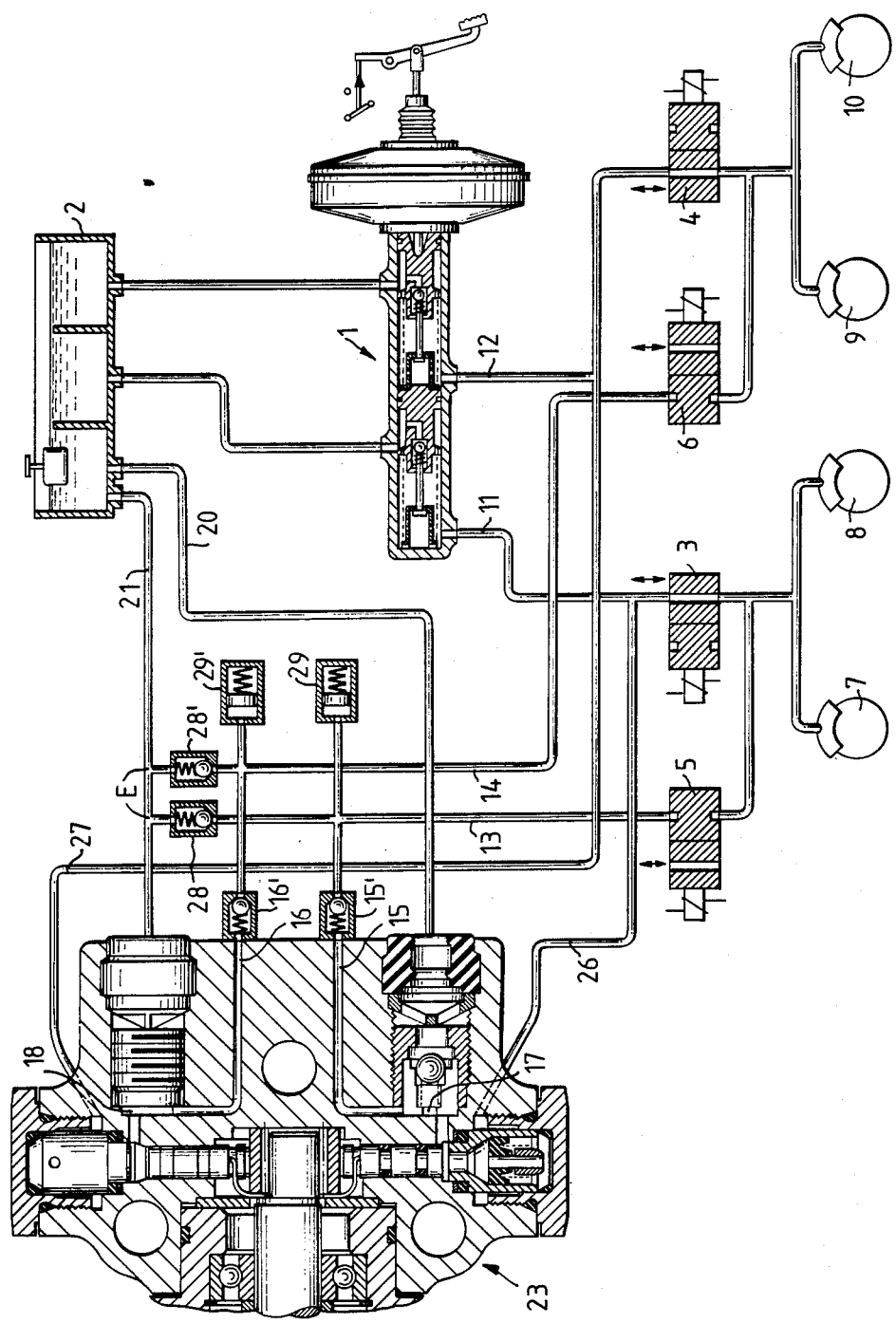

ANTI-LOCKING BRAKE SYSTEM

BACKGROUND OF THE INVENTION

This invention relates to an anti-locking brake system in which the pressure acting on the wheel brakes is reducible by bleeding hydraulic fluid through a return line utilizing a hydraulic pump whose suction chamber is connected through a suction line to a hydraulic fluid reservoir and is an improvement of the system disclosed in published German patent application No. 37 40 516.0.

A brake system of this type is known from published German patent application No. 36 01 914. In that brake system, the return line connects the outlet valves hydraulically to the hydraulic fluid reservoir. Since the pump operates only in case of need, the full pump capacity must be instantaneously available and, thus, a high pumping efficiency is of vital importance. In particular, in the case of reciprocating piston pumps with suction and discharge valves, the suction behavior encounters problems at very low temperatures (i.e., when the fluid has a high viscosity). If the auxiliary pressure supply system fails (for example, because the pump fails to start or fails to deliver), then the outlet valves must be prevented from opening so that a sufficient quantity of hydraulic fluid remains in the master cylinder or wheel cylinder in order to be able to at least ensure uncontrolled braking without having to employ the auxiliary pressure. For this reason, intricate and expensive measures have been necessary to monitor the brake system or the pressure supply and to rapidly detect any malfunctions as well as to partly or entirely switch off the control.

SUMMARY OF THE INVENTION

It is, therefore, an object of the present invention to optimize the suction behavior of the hydraulic pump and the reliability of a brake system with limited design effort and at low cost. This object is attained in a brake system of this type by connecting a return line from the wheel brakes to a suction chamber of a hydraulic pump and having the chamber terminate in a suction line extending from the chamber to a hydraulic fluid reservoir and positioning a valve or a restrictor or some other similar device in the return line upstream of a junction point between the return line and the suction line. In this regard, it has been found to be advantageous to provide a release valve for this purpose.

In one advantageous embodiment of the invention, a reserve volume cylinder instead of the valve is hydraulically connected to the return line upstream of the suction line junction with the return line.

For certain requirements, both a valve and a reserve volume cylinder advantageously are arranged upstream of the junction, the valve being incorporated between the junction and the reserve volume cylinder.

In another embodiment of this invention, a suction valve is incorporated in the return line near the point of connection to the hydraulic pump. The suction valve is positioned nearer to the hydraulic pump than the valve and/or the reserve volume cylinder. The hydraulic pump is a three-piston pump whose first and second pistons are each associated with an individual brake circuit and the third piston is associated with a traction slip control system for at least one of the two brake circuits.

In an additional embodiment of the invention, the hydraulic piping system between the hydraulic pumps or similar devices and the wheel brakes of the idling wheels of an automotive vehicle includes additional separating valves. These valves are inserted to enable change over in the traction slip control phase. They prevent pressure decrease (i.e., a discharge of the pressure generated in the auxiliary pressure supply system through the master cylinder) and allow a controlled pressure input into wheel brakes of idling wheels. By this means, the pressure reduction pulse by which the anti-locking control is initiated is utilized in the related controlled wheel cylinder to charge the hydraulic pump.

The inventive arrangement increases the fail safety of the brake system in the event of problems in the auxiliary pressure supply system and in case of leaking or erroneously selected outlet valves. Hydraulic fluid is allowed to flow freely into the fluid reservoir through the outlet valves only if and when the hydraulic pump delivers fluid and generates a determined pressure (i.e., only if and when the hydraulic pump, its drive motor and the selection device are operating properly). In the event of inoperability of the drive motor of the pump and of leaking or opened outlet valves only a limited brake pressure reduction (i.e. only a limited flow of hydraulic fluid out of the wheel brakes) will be possible. This means that a closed hydraulic cycle is preserved in the presence of a minimum pressure, so that a failure of the brake circuits is prevented and uncontrolled braking is safeguarded notwithstanding the aforementioned defects. Only the piston travel and, thus, the travel of the brake pedal are increased to a certain extent due to the accommodation of a volume of fluid on the part of the reserve volume cylinders.

BRIEF DESCRIPTION OF THE DRAWINGS

Further features, advantages and applications of the invention can be seen from the following description of a preferred embodiment of the invention taken in conjunction with the accompanying drawing, the single FIGURE of which is a simplified partly schematic illustration of the major hydraulic components.

DETAILED DESCRIPTION

The anti-locking brake system according to the drawing includes a tandem master cylinder 1 associated with a vacuum brake power booster. The tandem master cylinder 1 is connected, on one hand, to the hydraulic fluid reservoir 2 and, on the other hand, to the wheel brakes 7, 8 and 9, 10 through the respective brake tubings 11, 12 and inlet valves 3, 4. In this regard, the wheel brakes 7, 8 are associated, for example, with the front axle of an automotive vehicle, whereas the wheel brakes 9, 10 are related to the rear axle. The inlet valves 3, 4 are solenoid valves, which are open when de-energized.

A hydraulic connection leads from the wheel brakes 7, 8, 9, 10 to the outlet valves 5, 6 which are illustrated as solenoid valves and which are closed when de-energized. The outlets of outlet valves 5, 6 are connected to return lines 13, 14 respectively which, in turn, are connected through ducts 15, 16 to associated suction chambers 17, 18 of a hydraulic pump 23. The suction chambers 17, 18 are connected to the reservoir 2 through branches in suction lines 20, 21. Suction valves 15', 16' are positioned directly before ducts 15, 16 respectively and prevent pressure build-up in the return lines 13, 14 by the hydraulic pump 23. The suction lines 20, 21 constitute hydraulic links between the hydraulic fluid reservoir 2 and the hydraulic pump 23 and are designed as a dual-circuit.

Release valves 28, 28' and reserve volume cylinders 29, 29' are inserted in each of the return lines 13, 14 respectively, upstream of the junction E with the suction line 20, 21. Pressure lines 26, 27 are hydraulically linked to pump outlets not shown in the drawing and end up in the respective brake tubings 11, 12.

Neither the wheel sensors provided at each wheel nor the electric motor driving the pump 23 and the electronic control system are shown in the drawing to enhance clarity of the illustration of the present invention.

In the event of a braking action without activation of the anti-locking device, the wheel brakes 7, 8, 9, 10 will be subjected to pressure through the brake tubings 11, 12 and the open inlet valves 3, 4, which is generated in the tandem master cylinder 1 and is proportional to the pedal force. During this action, the hydraulic pump 23 is in the switched-off condition, the outlet valves 5, 6 being closed.

If during braking action a locking tendency of a vehicle wheel is detected by the sensors and by the electronic control system, then the associated outlet valve 5 or 6 will immediately be opened at least for a short period in order to reduce the brake pressure in the wheel brake associated with the wheel which threatens to be locked. Simultaneously, the hydraulic pump 23 will be switched on. Further modulation of the brake pressure will now be effected by selecting the inlet valves 3, 4 and the outlet valves 5, 6 in accordance with the variable mu characteristic of the electronic control system. The hydraulic fluid needed for these control operations is furnished by the hydraulic pump 23 which will be switched off again when the anti-locking control operation has ended.

In view of the fact that an anti-locking control phase is always initiated by opening of one outlet valve 5 or 6 and that simultaneously the pump 23 starts to run, a certain amount of hydraulic fluid will be conveyed through the return line 13 or 14 into the suction chamber 15 or 16 associated with the related pump circuit and onward, through a branch section to the suction lines 20 or 21 on each start of the pump. As a result, the reserve volume cylinder 29 or 29' will be filled with a volume of hydraulic fluid due to the closing pressure of the release valves 28, 28'. Under the effect of the force fed hydraulic fluid entering through the ducts 15 or 16, a flow is generated in the suction chamber 17 or 18 which also acts on the hydraulic fluid in the associated suction line 20 or 21 following known hydraulic principles. Within the framework of this procedure, the reserve volume cylinders 29, 29' will furnish a reserve volume and will balance fluctuations of the liquid column in the return lines 13 or 14.

A supplementary traction slip control system will enable supply of hydraulic fluid independently of two pump circuits of a three circuit type hydraulic pump, by a third circuit, (not shown in the drawing) of the pump. In this context, the hydraulic fluid is supplied to the third circuit out of the hydraulic fluid reservoir 2 through an additional branch (now shown in the drawing) of the suction line 20, 21. An outlet (not shown in the drawing) of the third pump circuit is hydraulically coupled with the brake circuit of the driven wheels. Additional separating valves not shown in the drawing are inserted in the hydraulic tubing system between the master cylinder outlets and the wheel cylinders of the idling wheels. These separating valves allow change over on activation of the traction slip control and prevent the brake pressure from being reduced through the master cylinder by a controlled input of pressure in the wheel cylinders of the idling wheels.

It will now be appreciated by those skilled in the art that in accordance with the present invention the suction chamber (17, 18) is first connected via suction line (20, 21) to the reservoir (2) which is connected to the master cylinder (1), and second, connected via return line (13, 14) to the wheel brakes. Both lines contain check valves (15', 16' for return line, not numbered for suction line) which open in the direction of the suction chamber. A connection between the suction line and the return line on the closed side of the check valves contains a release valve (28, 28'). This structure provides the following operation: Because of this suction line, return line and valve configuration, only a limited amount of hydraulic fluid flow out of the wheel brakes is possible in the event of pump failure. This is because an essentially closed hydraulic system is preserved in that event. That is, failure of the pump fluid flow from the outlet valves into the reservoir is substantially restricted and the brake system is maintained.

What is claimed is:

1. In an anti-locking brake system in which the pressure acting on the wheel brakes is reduceable by bleeding hydraulic fluid through a return line (13, 14), with a hydraulic pump whose suction chamber (17, 18) includes a check valve incorporated therein and is connected through a suction line (20, 21) to a hydraulic fluid reservoir, the improvement comprising connecting said return line (13, 14) to said suction chamber and having the chamber terminate in said suction line, positioning a first valve (28, 28') in said return line (13, 14) upstream of a junction point (E) between said return line and said suction line, and wherein a suction valve (15', 16') is inserted in said return line (13, 14) near the point of connection to said hydraulic pump, said suction valve being disposed nearer to said hydraulic pump than to said first valve (28, 28').

2. A brake system as claimed in claim 1 wherein said valve is a release valve.

3. A brake system as claimed in claim 1 wherein a reserve volume cylinder is arranged upstream of said junction and wherein said valve is positioned between the junction and the reserve volume cylinder.

4. A brake system as claimed in claim 1 wherein said hydraulic pump is a three-piston pump having first and second pistons associated with first and second brake circuits, respectively, and with the third piston being associated with a traction slip control system for at least one of the said first and second brake circuits.

5. A brake system as claimed in claim 1 including a hydraulic piping system between said hydraulic pump and the wheel brakes of idling wheels of an automotive vehicle wherein additional separating valves are inserted in the piping system between a master cylinder and the wheel brakes to allow change over in a traction slip control phase and which prevent a pressure decrease in an auxiliary pressure supply system through the master cylinder and a controlled pressure input in said wheel brakes of said idling wheels.

6. In an anti-locking brake system in which the pressure acting on the wheel brakes is reduceable by bleeding hydraulic fluid through a return line, with a hydraulic pump includes a check valve incorporated therein and whose suction chamber is connected through a suction line to a hydraulic fluid reservoir, the improvement comprising connecting said return line to said suction chamber and having the chamber terminate in said suction line, hydraulically connecting a reserve volume cylinder in said return line upstream of a junction point between said return line and said suction line.

7. A brake system as claimed in claim 6 wherein a suction valve is inserted in the said return line near the point of connection to the said hydraulic pump, said suction valve being disposed nearer to said hydraulic pump than to said reserve volume cylinder.

* * * * *